April 2, 1946.  M. G. HARDINGE  2,397,545
SELF-ADJUSTING FRACTURE REDUCING DEVICE
Filed Feb. 13, 1945
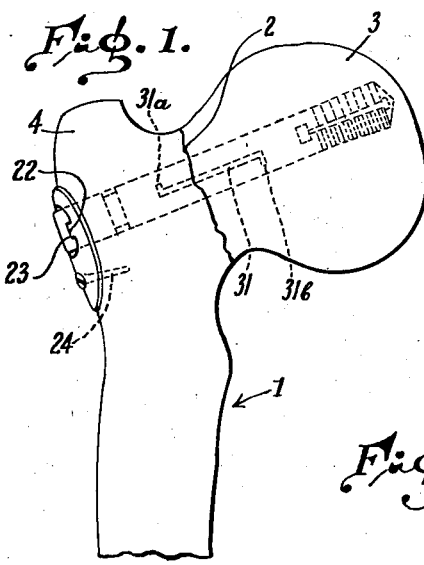
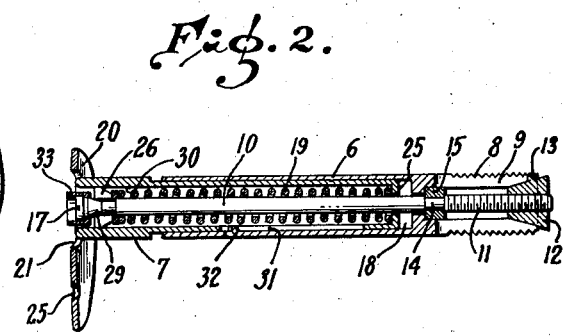
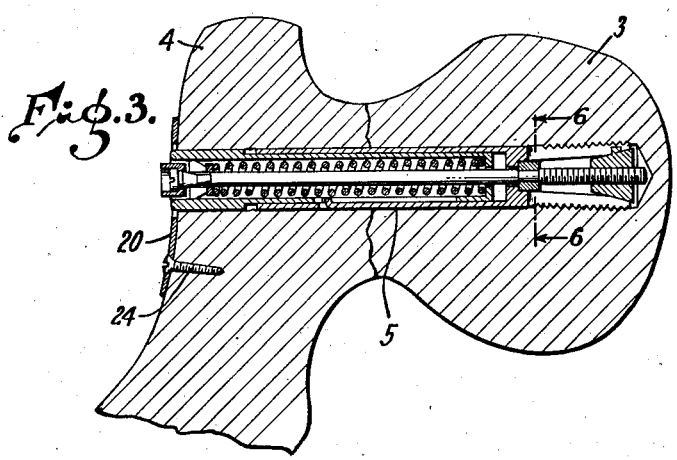
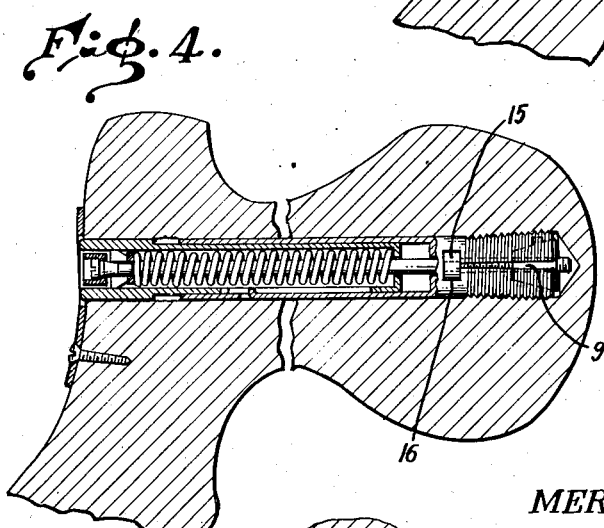
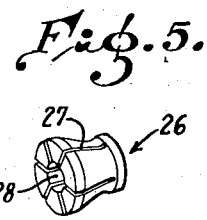
MERVYN G. HARDINGE,
INVENTOR.
BY
ATTORNEY.

Patented Apr. 2, 1946

2,397,545

UNITED STATES PATENT OFFICE 2,397,545

SELF-ADJUSTING FRACTURE REDUCING DEVICE

Mervyn G. Hardinge, Loma Linda, Calif.

Application February 13, 1945, Serial No. 577,609

9 Claims. (Cl. 128—92)

My invention relates to fracture reducing devices and has particular reference to a device especially adapted for the reduction of intertrochanteric and femoral neck fractures.

In the treatment of many bone fractures, it has been the practice to employ pins, screws and the like for the purpose of holding the distal and proximal bone fragments in accurate alignment with each other and with the hope that the ends of the fragments will be sufficiently close together as to permit the rapid knitting of the fragments together. In my United States Patent No. 2,381,050 issued August 7, 1945, I have described and claimed one form of such fracture reducing device comprising essentially a bolt-like member adapted to be inserted into a bore penetrating into the two bone fragments, the inner end of the bolt structure being expanded to grip the proximal fragment and a nut arrangement being provided upon the bolt to draw the two fragments into tight abutting relation with each other.

In many fracture cases, however, it occurs that there is an absorption of the bones at the abutting fragment ends, with the result that nails, bolts or other means which have heretofore been used for the reduction of such fragments while holding the fragments in alignment with each other, actually hold the ends of the fragments apart when such absorption occurs.

It is, therefore, an object of my invention to provide a fracture reducing device which is not only adapted to initially draw the bone fragments into close relation with each other, but is adapted to be automatically self-adjusting while in place within the bones to take up for any spacing which may occur as a result of the bone absorption.

It is also an object of my invention to provide a fracture reducing device of the character described wherein the fracture reducing device comprises a bolt and nut structure adapted to grip the proximal fragment and to draw the distal fragment into abutting relation therewith by spring tension, permitting the yielding of the device in a direction tending to draw the bone fragments together and wherein means is provided for preventing yielding of the device in any other direction.

Another object is to provide a fracture reducing device of the character set forth in the preceding paragraph wherein a spring is employed for the purpose of constantly urging the bone fragments toward each other and wherein an over-riding clutch mechanism is employed to permit yielding movement of the device tending to contract the bone fragments toward each other but preventing elongation of the device when any force is exerted tending to draw the bone fragments away from each other.

Other objects and advantages of my invention will become apparent from a study of the following specifications, read in connection with the accompanying drawing, wherein:

Fig. 1 is an elevational view of a portion of a typical femur having a fracture at the connection thereof and illustrating the manner in which my fracture reducing device may be employed therein;

Fig. 2 is a longitudinal sectional view taken through the fracture reducing device shown in Fig. 1 and illustrating the parts thereof in their initial positions ready for insertion into the bone fragments;

Fig. 3 is a sectional view through the bone fragments shown in Fig. 1 and through my fracture reducing device illustrating the position of the parts thereof when fixed within the bone fragments;

Fig. 4 is a sectional view similar to Fig. 3 and illustrating the positions of the parts of my fracture reducing device when there has been absorption of the bone at the abutting ends of the fragments;

Fig. 5 is a detailed perspective view of the clutch employed as a part of my fracture reducing device; and Fig. 6 is a detail sectional view taken along the line VI—VI of Fig. 3.

Referring to the drawing, I have illustrated my fracture reducing device as employed for the reduction of fractures of the neck of the femur. While in the following description the successive operations and relative positions of the parts of my fracture reducing device will be described with reference to the treatment of such a fracture, it will be understood by those skilled in this art that my device may be used for the treatment of other fractures wherein there is a tendency of the muscles surrounding the bone or movements of the patient to alternately exert forces tending to press the bone fragments together and to spread them.

In Fig. 1 I have shown the upper end of a typical femur 1 having a fracture as indicated by the line 2 at the junction between the neck and body portion of such bone, the neck or proximal fragment 3 being illustrated in the position it should assume when it is brought into abutting relation with the distal fragment 4 in the treatment or reduction of the fracture.

In reducing such a fracture the two bone fragments are brought into alignment and into abutting relation with each other and a bore 5 is drilled through the distal fragment 4 and well into the head or proximal fragment, the course of such bore being preferably centered through the neck or as nearly as possible along the axis of the neck to permit the greatest possible annular cross section of bone to surround the bore.

My fracture reducing device is then inserted into the bore 5, the fracture reducing device preferably comprising a pair of telescopically assembled tubular members 6 and 7, the member 6, for purposes of distinction herein, being referred to as the inner member or proximal fragment engaging member while the member 7 may be defined as an outer member or distal fragment engaging member.

The inner member 6 is preferably formed with its extreme inner end threaded or grooved as indicated at 8 and provided with a plurality of slots 9 extending from the extreme inner end to permit the inner end portion of the member 6 to be expanded laterally to grip the interior surface of the bone bore lying within the proximal fragment or head of the femur. To expand the member 6 into such gripping relation, I prefer to provide a screw 10 extending longitudinally through the member 6, the inner end of the screw 10 being provided with threads as indicated at 11 to threadedly engage an expander or wedge member 12 preferably constructed in the shape of a truncated cone having projecting laterally from its side a projection 13 having a width such that it may slide in one of the slots 9 to prevent rotation of the wedge 12 when the screw 10 is rotated to draw the wedge inwardly of the member 6 in the expanded operation.

The screw 10 is fixed against longitudinal movement within the member 6 as by forming a reduced diameter portion 14 thereon over which is placed an abutment member 15 illustrated particularly in Fig. 6 as a substantially U-shaped piece of metal adapted to be inserted in a transverse slot 16 formed through the member 6, the intercoupling of the screw 10 and the member 6 by the abutment 15 permitting substantially free rotation of the screw 10 within the member 6, but preventing any relative longitudinal movement between them. The outer end of the screw 10 may be formed with a slot 17 by which a screw driver or other tool may engage the screw for the purpose of rotating the same.

The outer member 7 is preferably constructed as a hollow tube insertable within a longitudinal bore 18 extending from the outer end of the inner member 6 but which terminates immediately adjacent the threaded and expandable inner end thereof, the length of the portion of the outer member 7 telescopically assembled within the bore 18 being such that the assembled members have sufficient rigidity to oppose any lateral forces exerted upon them and thus oppose and prevent any lateral displacement of the bone fragments relative to each other.

The outer end of the member 7 is preferably of an enlarged diameter so that its outer surface is flush with the outer surface of the inner member 6 so as to snugly fit within the bore 5.

The extreme outer end of the outer member 7 is provided with any suitable head-like structure which will engage the exterior surface of the distal fragment 4 so that a spring 19 interposed between the screw 10 and the outer member 7 will constantly urge the telescopically assembled members 6 and 7 toward a contracted position and thus tend to constantly urge the bone fragments into close abutting relation with each other. The particular form of head illustrated herein comprises a substantially oval-shaped plate 20 preferably hingedly secured to the outer member 7 as by means of providing an aperture 21 through which the outer end of the member 7 may extend, the plate 20 having ears 22 which project into transverse openings 23 formed in the member 7 to define a pivotal hinge connection.

The diameter of the aperture 21 should be considerably in excess of the external diameter of the member 7 to permit the placing of the plate 20 at various angles to the longitudinal axis of the outer member 7 so that irrespective of the angle between the axis of the bone bore 5 and the outer surface of the distal fragment 4, the plate 20 may be disposed against this surface throughout its length and may be secured thereto as by means of a screw 24 extending through a hole 25 in the plate 20 and into the distal fragment 4.

The spring 19 which urges the members 6 and 7 toward their contracted position preferably has one of its ends bearing upon an inturned end wall 25 formed upon the inner end of the outer member 7 while the opposite end of the spring 19 bears against a clutch member 26 having a shape illustrated particularly in Fig. 5 as comprising a substantially cylindrical metal collar having a plurality of longitudinal slots 27 extending from its outer end to permit radial expansion and contraction. The outer end of the screw 10 passes through a central bore 28 in the clutch 26 and has adjacent its outer end a tapering enlargement 29 which, as the spring urges the clutch member 26 outwardly along the screw 10, will expand the clutch 26 into gripping relation with the interior surface 30 of the hollow outer member 7. Thus the spring 19 not only acts to constantly urge the telescopically assembled members 6 and 7 toward their contracted position, but also urges the clutch member into its expanded position, causing the clutch member to act to rigidly oppose any elongation of the assembled members.

As illustrated particularly in Fig. 3, the operation of placing my fracture reducing device into the bone bore comprises insertion of the assembled members 6 and 7 into the bone bore 5 until the plate 20 bears against the outer surface of the distal fragment 4. The screw 10 is then rotated to cause expansion of the inner end of the member 6 to grip the proximal fragment 3, the spring then acting to draw the fragments tightly together. The screw 24 is then inserted to hold the plate 20 in its position against the outer surface of the fragment 4.

Assuming that during the healing process there is a tendency for the bone to be absorbed at the line of fracture, the two fragments are constantly drawn toward each other to take up for any such absorption by the action of the spring 19. This contracting motion is aided by the effect of the muscles surrounding the bone fragments which tend to draw the fragments together and is also further aided by any movement of the patient which would tend to place weight upon the femur, such as the action of standing or walking. However, if any force is exerted on the bone fragments tending to oppose the action of the spring, the effect will be only to more tightly insert the tapered enlargement 29 of the screw 10 into the clutch member 26 and thus to cause the clutch member to grip the outer member 7 and prevent elongation of the assembled members. The nature of the clutch 26 is such, however, that it does not oppose contracting movement of the members 6 and 7 relative to each other but only acts to oppose elongation or extension of these members.

After the healing process is completed, the fracture reducing device may be removed from the bore 5 as by removing the screw 24, unscrewing the screw 10 to permit the expanded threaded portion 8 of the proximal engaging member 6 to contract or collapse and the entire device may then be removed merely by rotating the assembly to break it loose from any bone processes which have accumulated about the assembly. If the expanding end of the proximal engaging fragment 6 is threaded rather than roughened or grooved, it will be apparent that such rotation or movement will unscrew the assembly from the bone bore 5.

To facilitate rotational movement of the inner member 6 by forces exerted upon the outer member 7, I prefer to provide an elongated slot 31 in the outer member 7 and to project thereinto an inwardly struck finger 32 struck from the inner member 6 to so interengage these members as to prevent relative rotation between them.

It may be desirable during either the operations of inserting or removing the device from the bone bore to move the members 6 and 7 to an extended position against the force of the spring 10 and while such movement would normally be opposed by the action of the clutch 26, the clutch may be manually disengaged as by projecting against the outer end of the clutch member 26 a tubular device which will pass over the outer end of the screw 10 and press the clutch 26 inwardly along the screw 10 or, as illustrated in the form of the device shown in the drawing, a clutch disengaging collar 33 may be assembled upon the outer end of the head of the screw 10 adapted to extend a sufficient distance outwardly of the bone bore to permit the collar to be pressed inwardly by the engagement therewith of any suitable pressing tool, the action of the collar 33 being to engage the outer end of the clutch 26 and press it inwardly, thus permitting the clutch 26 to contract sufficiently to disengage the outer member 7 and allow it to be moved to an extended position, projecting out of the bone bore.

If desired, a lateral extension of the slot 31 may be formed at each of its ends, as indicated at 31a and 31b, whereby a slight rotational movement is permitted between the inner and outer members to engage the finger 32 when the members are in either their fully extended or fully contracted positions to thereby facilitate the insertion of the fracture reducing device into the bone bore while it is locked in either the extended position or the contracted position, whichever appears to the surgeon to be most suitable.

It will therefore be seen that I have provided a fracture reducing device in which the members 6 and 7 provide ample support for holding the bone fragments in alignment with each other sufficient to permit a patient to resume normal activity substantially immediately after the reducing device has been inserted, while the device is automatically self-adjusting to hold the fragments in abutting relation with each other during the entire healing operation irrespective of the fact that some absorption may occur at the fracture line.

While in the form of the device illustrated and described herein, the spring performs a double function of urging the two telescopic members toward their contracted position and urging the clutch member into its engaged clutching relation with the outer member, it will be apparent that the primary function of the spring is that of actuating the clutch toward its engaged position and, if desired, a relatively short and light spring may be substituted, functioning solely to urge the clutch to disengaged position, in such case the activity of the patient being depended upon for moving the telescopic members toward their contracted position while the clutch prevents any elongation of the fracture reducing device.

While I have shown and described the preferred embodiment of my invention, I do not desire to be limited to any of the details of construction shown or described herein, except as defined in the appended claims.

I claim:

1. In a fracture reducing device, a pair of elongated members for insertion into a bone bore extending into two or more adjacent bone fragments, said members being telescopically assembled one upon the other for longitudinal movement relative to each other between a contracted position and an extended position, means on one of said members for engaging one of the bone fragments, means on the other of said members for engaging the other of said bone fragments, and clutch means intercoupling said members for substantially free movement toward said contracted position and opposing movement of said members toward said extended position.

2. In a fracture reducing device, a pair of elongated members for insertion into a bone bore extending into two or more adjacent bone fragments, said members being telescopically assembled one upon the other for longitudinal movement relative to each other between a contracted position and an extended position, means on one of said members for engaging one of the bone fragments, means on the other of said members for engaging the other of said bone fragments, clutch means intercoupling said members for substantially free movement toward said contracted position and opposing movement of said members toward said extended position, and spring means interposed between said members and acting upon said clutch means for normally urging said members toward their contracted position and urging said clutch into clutching relation between said members.

3. In a fracture reducing device, a pair of tubular members telescopically assembled one within the other for insertion into a bone bore extending into two or more adjacent bone fragments, means on one of said members for expanding one end of said member into gripping relation with the interior of that portion of the bore disposed in the proximal fragment, means on the other of said members for engaging the exterior surface of the distal fragment, clutch means mounted upon the first of said members and disposed within the other of said members, and means for expanding said clutch means into engagement with the interior of the other of said members, said expanding means being disposed to normally expand said clutch means into said engaging relation and being releasable upon relative movement of said members toward their contracted position.

4. In a fracture reducing device, a pair of tubular members telescopically assembled one within the other for insertion into a bone bore extending into two or more adjacent bone fragments, means on one of said members for expanding one end of said member into gripping relation with the interior of that portion of the bore disposed in the proximal fragment, means on the other of said members for engaging the exterior surface of the distal fragment, an expandable collar carried by said one member and disposed within the other of said members to engage the other of said members and prevent relative longitudinal movement between said members, and means responsive to forces tending to move said bone fragments in a direction tending to move said members toward their contracted position for permitting contraction of said collar to allow movement of said members in said direction.

5. In a fracture reducing device, a pair of tubular members telescopically assembled one within the other for insertion into a bone bore extending into two or more adjacent bone fragments, means on one of said members for expanding one end of said member into gripping relation with the interior of that portion of the bore disposed in the proximal fragment, means on the other of said members for engaging the exterior surface of the distal fragment, an expandable collar carried by said one member and disposed within the other of said members to engage the other of said members and prevent relative longitudinal movement between said members, and means responsive to forces tending to move said bone fragments in a direction tending to move said members toward their contracted position for permitting contraction of said collar to allow movement of said members in said direction, said last-named means including a spring interposed between said collar and said other member to thereby constantly urge said members toward their contracted position.

6. In a fracture reducing device, a proximal bone engaging member and a distal bone engaging member each comprising a tubular element, said members being telescopically assembled one upon the other for longitudinal movement relative to each other, the end of said proximal engaging member being longitudinally slotted to permit expansion thereof with gripping engagement with the interior of a bone bore with which it is inserted, means for expanding said slotted end comprising a screw extending longitudinally through the assembled members and a wedge nut threaded thereon to expand said end of said member when it is drawn inwardly of said member, means mounting said screw upon said proximal fragment engaging member for rotational movement of said screw by fixing said screw against longitudinal movement relative to said member, a tapered head on said screw, an expandable clutch collar surrounding said screw inwardly of said head, and means for urging said collar along said tapered head to expand the collar into engagement with the interior of the distal fragment engaging member.

7. In a fracture reducing device, an elongated assembly adapted to be inserted into a bone bore extending into two or more bone fragments, means on said assembly for expanding one end of the assembly to grip that portion of the bone bore disposed within the proximal bone fragment, and means on the other end of said assembly for engagement with the distal bone fragment, said means comprising a plate adapted to extend along the outer surface of the distal bone fragment, and means hingedly connecting said plate to said other end of said assembly, whereby said plate may extend in the plane of the outer surface of said bone fragment irrespective of the angle of the bore relative to said surface.

8. In a fracture reducing device, a pair of elongated members for insertion into a bone bore extending into two or more adjacent bone fragments, said members being telescopically assembled one upon the other for longitudinal movement relative to each other between a contracted and an extended position, means on one of said members for engaging one of the bone fragments, means on the other of said members for engaging the other of said bone fragments, spring means interposed between said members for normally urging said members toward their contracted position, and means for latching said members against movement toward either contracted or extended position when said members are in either of their fully extended or fully contracted positions.

9. In a fracture reducing device, a pair of elongated members for insertion into a bone bore extending into two or more adjacent bone fragments, said members being telescopically assembled one upon the other for longitudinal movement relative to each other between a contracted and an extended position, means on one of said members for engaging one of the bone fragments, means on the other of said members for engaging the other of said bone fragments, spring means interposed between said members for normally urging said members toward their contracted position, a longitudinal slot in one of said members having laterally extending extensions formed at each of its ends, and means on the other of said members projecting into said slot for limiting rotational movement of said members relative to each other and for latching said members in either their fully extended or fully contracted positions.

MERVYN G. HARDINGE.